Dec. 29, 1970     H. J. GREENSPAN ETAL     3,550,254
METHOD AND MEANS FOR SOLID STATE JOINDER

Filed April 5, 1968     2 Sheets-Sheet 1

INVENTORS
HAROLD J. GREENSPAN
BY LOUIS F. ECKER

ATTORNEY

Dec. 29, 1970   H. J. GREENSPAN ETAL   3,550,254
METHOD AND MEANS FOR SOLID STATE JOINDER
Filed April 5, 1968   2 Sheets-Sheet 2
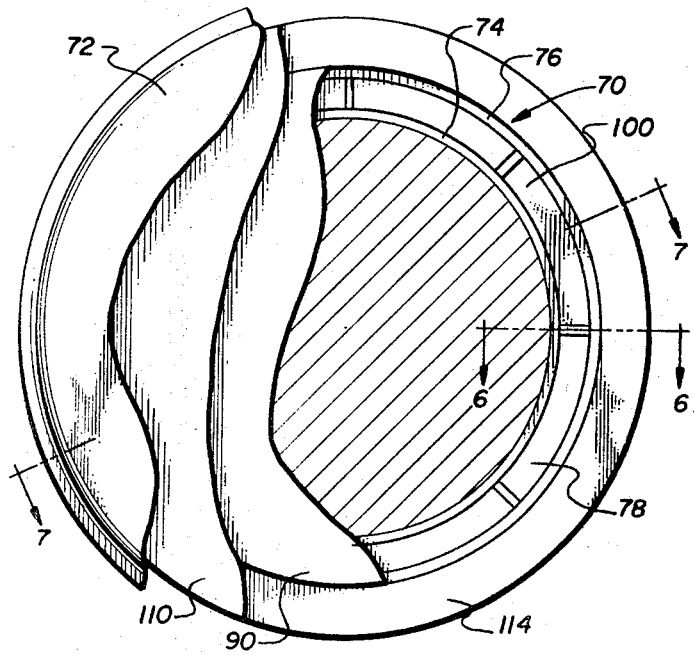
FIG. 5
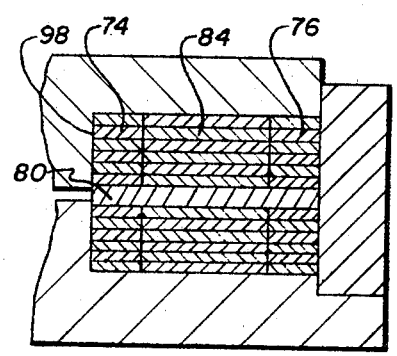
FIG. 6
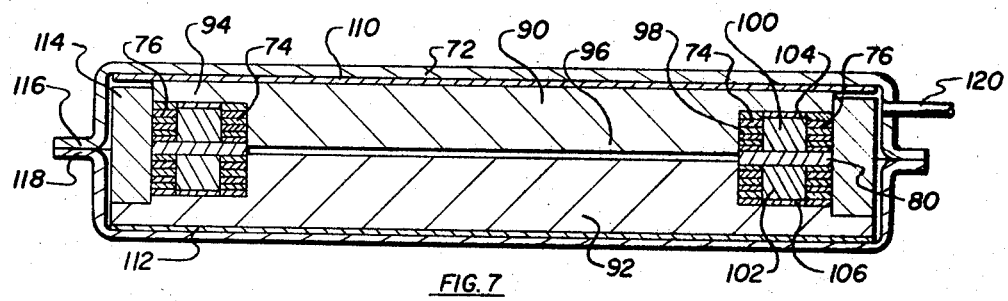
FIG. 7
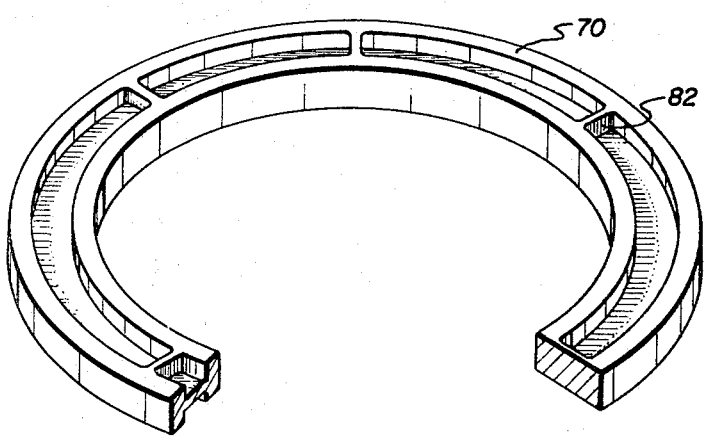
FIG. 8
INVENTORS
HAROLD J. GREENSPAN
LOUIS F. ECKER
BY
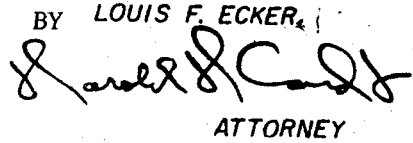
ATTORNEY United States Patent Office 3,550,254
Patented Dec. 29, 1970

3,550,254
METHOD AND MEANS FOR SOLID STATE JOINDER
Harold J. Greenspan, Los Angeles, and Louis F. Ecker, Beverly Hills, Calif., assignors to North American Rockwell Corporation
Filed Apr. 5, 1968, Ser. No. 719,182
Int. Cl. B23k 5/22, 31/02
U.S. Cl. 29—493
11 Claims

ABSTRACT OF THE DISCLOSURE

Solid-state bonding of separate workpiece elements is accomplished by placing such elements within constraining tooling masses with the elements in contact at those areas where joinder is desired. The stated areas are in non-parallel planes, such as vertical, horizontal or angular. The tooling masses and materials are selected and positioned to apply pressure across the joint areas due to thermal effects on the dimensions of the masses.

BACKGROUND

In processes known to the prior art for solid state diffusion bonding of separate elements to form a single unitary mass therefrom, high temperatures and pressures are applied to the elements. It is normal practice in the prior art to apply pressure in a direction perpendicular to the plane of the joint across which a diffusion bond is sought to be made. Where pressure is applied to the heated workpiece by horizontal platens, for example, all the planes of the joints resulting from such pressure must be parallel and uniformly transverse to the vertical direction of such pressure. As a result, no joints can be formed on the mentioned workpiece where the contacting surfaces of such joints are parallel to the direction of pressure application, or angularly disposed relative thereto.

SUMMARY OF INVENTION

Referring to FIG. 3, the invention in this case is illustratively shown by tubular workpiece elements 30 and 32 telescopically arranged with faying surfaces 34 and 36 of each element, respectively, in substantially uniform surface contacting relationship over a portion of their area. Surfaces 34 and 36 are vertically oriented within hollow cavity 37 at the lower end of the element 30. Flange portion 48 is a separate workpiece element to be joined to element 32.

Tooling masses 38, 40, 44, and 50 are illustratively a steel alloy within the 300 series such as 321 stainless steel, while tooling mass 42 is illustratively PH 17-4 Mo advanced alloy steel and the workpiece elements discussed above are titanium. Retort 52 isolates the foregoing elements from surrounding atmosphere and is contacted by ceramic sleeve 43 which is contained within outer cylinder 45. Diffusion bonding of workpiece elements 30, 32, and 48 to form the single unitary workpiece 64 shown in FIG. 4 is accomplished by application of pressure vertically between platens 60 and 62. Compressive force between the stated platens is of a magnitude which would normally result in diametrical expansion or deformation of cylindrical elements 30, 32, and 42, in the absence of restraining mass 43, since the same are elevated to high temperature and maintained thereat. Sleeve 43, under the restraint of element 45, prevents deformation of mass 42 during high compressive loads applied to retort 52 and its contents. Prevention of deformation of the tooling masses results in a substantially isostatic pressure application on the workpiece elements, and permits reuse of the tooling members many times during mass production of diffusion bonded workpieces. Moreover, the use of 300 series steels and PH 17-4 Mo alloy for tooling masses 38, 40 and mass 42, respectively, results in easy separation of the workpiece from the tooling elements after diffusion bonding is complete without requiring stopoff compounds or shims to prevent bonding of the workpiece elements to the tooling elements.

BRIEF DESCRIPTION OF DRAWINGS

FIG. 5 shows a plan view, partly broken away, of a tooling and workpiece layup for accomplishing the novel method disclosed herein to form a workpiece of substantial size and complex configuration, FIG. 6 shows an isolated cross-sectional view of structure shown in FIG. 5 and taken along line 6—6 from FIG. 5, FIG. 7 shows a cross sectional view of the structure shown in FIG. 5 taken along line 7—7 in FIG. 5, and FIG. 8 is a general perspective view, partly cut away, of the finished workpiece resulting from the structure and method suggested in FIGS. 5-7.

DETAILED DESCRIPTION OF INVENTION

The method and structure disclosed herein solve several different problems encountered in production of diffusion bonded workpieces. One such problem involves diffusion bonding by press platens wherein the pressure is normally applied in one direction only, which would ordinarily prevent formation of workpieces involving faying surfaces which are non-planar and non-parallel, such as vertical and horizontal surfaces in a single workpiece. Another such problem involves the incidental and often unavoidable bonding of tooling elements to workpiece elements when both are closely united within the same layup and exposed to precisely the same temperatures and pressures, whereby destruction of the tooling is frequently necessary in order to extricate the finished workpiece therefrom. Due to the foregoing phenomena, such tooling is normally not reusable because it is damaged, distorted or destroyed after the fabrication process is otherwise complete. Destruction of such tooling obviously increases the cost of diffusion bonding by static presses. Another such problem results from the use of stopoff compounds or shims such as are sometimes used to prevent diffusion bonding between workpiece and tooling surfaces, and which often involve the risk of contaminating the material of the workpiece in those surface areas contacted by the stopoff compound or shim due to molecular activity of the latter.

A major advantage of the concept disclosed herein is a considerable saving in equipment and tooling costs, particularly by avoiding any risk of damage to filler metal or tooling elements whereby the same may be reused many times in mass production of diffusion bonded parts. Another advantage of the invention in this case is its adaptability to workpieces of relatively complex configuration such as involving webs, holes, cavities or other non-uniform distributions of mass. Another advantage is the ability of the novel method and apparatus in this case to achieve uniformly strong, reliable diffusion bonded joints at a plurality of different locations on a workpiece characterized by initial faying surfaces or edges in diverse positions of angularity and non-parallel planes. In addition, the initial integrity and structural properties of rolled sheet titanium, for example, are preserved throughout the workpiece whereby large concentrations of mass are not characterized by drastic granular changes of structure in the center of such mass, as normally identified with soft core portions of titanium forgings. Heat-treating of the workpiece is thus considerably easier and not of such critical importance as with massive titanium forging.

Figure 1:
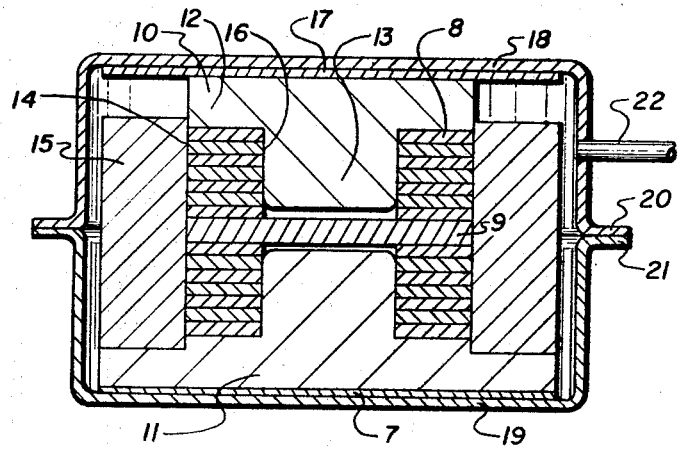
FIG. 1 shows a cross-sectional view of the tooling and workpiece layup within an airtight envelope and arranged to accomplish the novel method disclosed herein.

Referring to FIG. 1, the novel method disclosed herein may be practiced with a plurality of separate workpiece elements such as hollow disc-shaped titanium wafers 8 stacked upon each other to form a generally cylindrical body such as suggested by the arrangement of wafers 8 in FIG. 1. A solid center disc 9 may illustratively be included in the mentioned stack so as to form the center web portion in the finished workpiece. A generally cylindrical force-transmitting member 10 is arranged in a tooling layup as shown in FIG. 1 and corresponds generally with member 11. Tooling mass 10 has an annular flange portion 12 and an axial center boss or projection 13 formed thereon. The outer peripheral surface 14 on the cylinder defined by stacked wafers 8 is constrained by the inner surface of cylindrical restraining mass 15 surrounding the assembled workpiece components in the manner shown by FIG. 1. Inner cylindrical surface 16 of the collective body formed by wafers 8 is also restrained by substantially uniform surface contact with the outer cylindrical surface of boss 13 on tooling mass 10. A diffusion barrier sheet 7 and a corresponding sheet 17 of material such as titanium may be optionally preplaced in contact with tooling masses 10 and 11 to prevent permanent diffusion bonding of the stated masses with a surrounding steel envelope comprising two equal half sections 18 and 19. Sections 18 and 19 are provided with annular flanges 20 and 21 which may be joined together by suitable means such as welding to seal the envelope 18, 19 in airtight relationship. With the envelope thus sealed, atmosphere from within the envelope may be evacuated by connection of line 22 to a source of vacuum (not shown) after which the envelope may be filled or pressurized with an inert gas through the same line 22. Inert masses 10 and 11 advantageously comprise a steel alloy within the 300 series such as 321 stainless steel. Outer tooling mass 15 advantageously comprises a material characterized by thermal expansion upon cooling from an elevated temperature, and may illustratively consist of PH 17–4 Mo advanced alloy steel.

Figure 3:
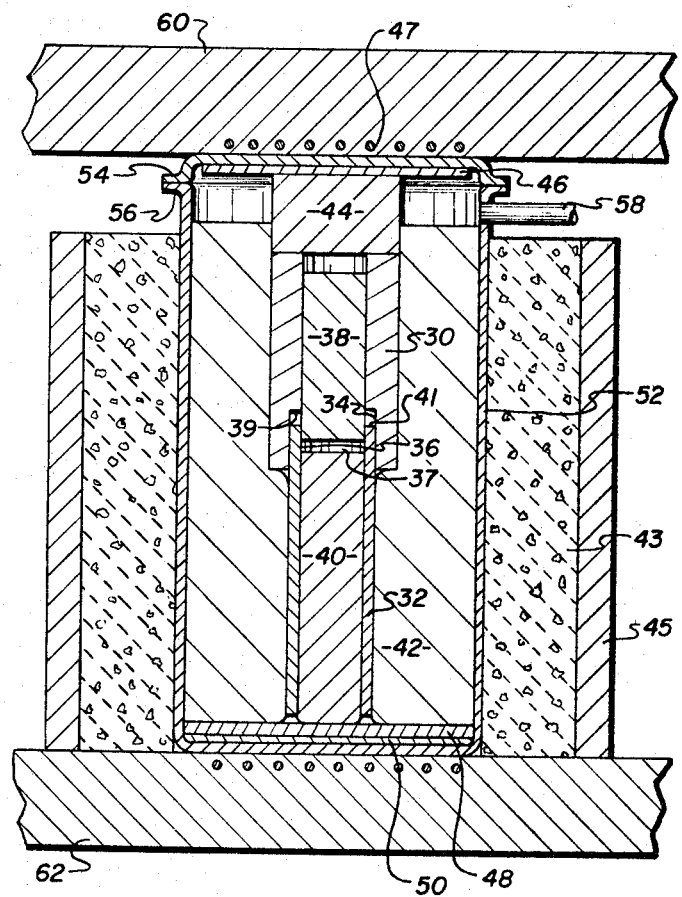
FIG. 3 shows a view generally corresponding to FIG. 1 but with a different workpiece configuration.

After heating envelope 18, 19 and its contents to an elevated temperature less than the melting point of the envelope or any of its contents, the same are subjected to static compressive force by suitable means such as platens 60 and 62 suggested in FIG. 3, simultaneous with maintaining of the same at an elevated temperature for a sufficient time to cause diffusion bonding of workpiece elements 8 and 9 to each other. During the application of pressure vertically through envelope 18, 19, restraining mass 15 prevents diametrical outward deformation of elements 8 and 9 which would otherwise occur, thus producing a simulated condition of hydrostatic pressure equilibrium on the workpiece. The entire structure shown in FIG. 1 is thereafter cooled. During the mentioned cooling, the internal tooling masses 10 and 11 shrink and thereby separate their surfaces away from surface 16 of the workpiece, for example. In addition, outer tooling mass 15 expands radially during cooling, particularly at about 400° F. and below, with the result that tooling mass 15 separates its inner cylindrical surface away from surface 14 of the workpiece and allows complete removability of the mentioned tooling masses from the workpiece formed by elements 8 and 9. No stopoff compounds or shims are necessary between tooling elements 10, 11, 15, and workpiece elements 8 and 9, since the mentioned dimensional phenomena allow easy removal of the workpiece from the tooling without risk of bonding the same together. The mentioned tooling items thereafter may be used again many times in forming other workpieces from similar elements 8 and 9, provided that permanent deformation of the tooling elements does not result from the high compressive forces associated with solid state bonding.

Figure 2:
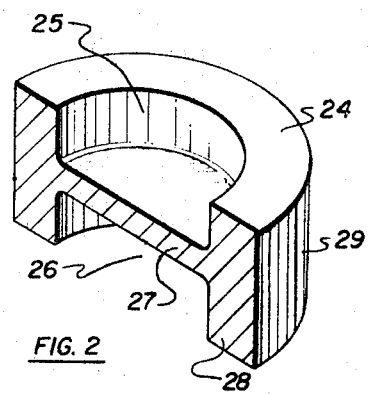
FIG. 2 shows a finished workpiece resulting from the process and apparatus suggested by FIG. 1.

The finished solid unitary workpiece resulting from the apparatus and procedures discussed above in connection with FIG. 1 is shown in FIG. 2 and is designated by reference numeral 24. Workpiece 24 may be seen to comprise two axially aligned cavities 25 and 26 separated by a solid center web section 27 surrounded by a generally cylindrical mass 28 having an outer peripheral surface 29. Illustratively, where the workpiece material is titanium, complete bonding may be accomplished at 1600° F. and 1000 p.s.i. compressive force continuously maintained for 24 hours, during which no deformation of restraining mass 15 should result.

It will be understood that the inventive concept in this case may be practiced with a wide variation of metals and alloys, and that the parameters for achieving solid state diffusion bonding will necessarily vary for each particular choice of workpiece material. Among the metals or alloys which may be joined by solid-state diffusion bonding are aluminum, stainless steel, titanium, nickel, tantalum, molybdenum, zirconium and columbium. Diffusion bonding is characterized by intermolecular exchange between contacting surfaces of the workpiece at suitable pressures and at temperatures below the melting point of the workpiece material. In some cases, a thin interleaf material, or eutectic former, is provided while in other forms of solid-state bonding no interleaf material is required. The prior art involving solid-state or inter-molecular diffusion bonding includes issued Pats. 3,145,466; 3,180,022; 3,044,160; 2,850,798; and 3,170,234. The precise values of time-temperature and pressure utilized in connection with bonding workpiece materials is not a critical or limiting feature of the broad concept disclosed herein, but specific materials with which the concept is usable are stated for illustration only. Thus, for example, if workpiece 10 is titanium, solid-state bonding thereof may be achieved under coordinated time-temperature-pressure conditions of from about 2 to 10 hours, from about 1500°–1700° F. and from about 250–2000 p.s.i. compressive force. Where large workpieces are sought to be diffusion bonded, total forces on the order of 500 tons would be required. Similarly, many different metals or alloys for all the tooling elements such as items 10, 11, and 15 could be used to practice the inventive principles taught herein, in addition to those illustratively mentioned.

According to a further illustrative embodiment of the inventive principles in this case, the structure shown in FIG. 3 includes tubular elements 30 and 32 telescopically arranged as discussed above. Faying surfaces 34 and 36 of elements 30 and 32 are vertically oriented in a direction parallel to the direction of compressive force applied by platens 60 and 62, hence would not normally form a solid state bond therebetween except for the inventive principles embodied in the arrangement suggested by FIG. 3. Surfaces 39 and 41 on elements 30 and 32, respectively, are forced into close contact by the stated compressive force and thus form a bond therebetween, as are elements 48 and 32 discussed above. The entire assembly of workpiece elements together with tooling masses 38, 40, 42, 44, and 50 are enclosed within airtight envelope or retort 52 which may be formed in two separate parts and welded closed about annular flanges 54 and 56. Evacuation of the envelope is accomplished through conduit 58 connected to an external source of vacuum (not shown) and may also be used to fill envelope 52 with a suitable inert gas from an external source (not shown) prior to the bonding step, if desired.

Retort 52 is surrounded by cylindrical restraining mass 43 of suitable temperature-resistant material having sufficient strength to resist radial outward deformation of the workpiece and tooling elements within retort 52. Such deformation would otherwise result from application of compressive force by platens 60 and 62, especially at high temperature which is maintained during the bonding operation by electrical resistance heating elements 47 or the like operatively associated with the platens. Further restraining means are provided to prevent structural failure of mass 43 in the form of outer metallic cylinder 45 surrounding the same. As suggested by FIG. 3, mass 43 is preferably a ceramic, such as that sold as Masrock, available from Glasrock Products, Inc., 1101 Glidden Street NW., Atlanta, Georgia 30318.

Figure 4:
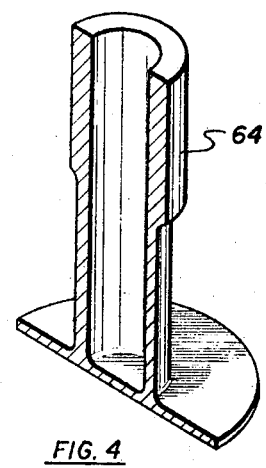
FIG. 4 shows a finished workpiece resulting from the process and apparatus suggested in FIG. 3.

In practice, envelope 52 and its contents are heated to a suitable temperature sufficient for diffusion bonding to occur between elements 30, 32, and 48. Then the envelope and contents are placed within mass 43 and between heated platens 60 and 62, after which force is applied vertically between the platens while the elevated temperature is maintained constant for a sufficient duration to effect joinder of elements 30, 32, and 48. Due to the spacing of outer restraining element 45 from the heated elements within envelope 52, the insulating effect of ceramic mass 43 results in higher strength in element 45 than that which would be obtained if the same were heated. Thus, radial growth of the elements within retort 52 is firmly resisted by mass 43 reinforced by element 45 so that no lateral deformation of tooling elements 38, 40, and 42 can occur, and the stated tooling elements are reusable many times in mass producing workpieces dimensionally coinciding with workpiece 64 in FIG. 4. The ceramic mass 43, during application of force by platens 60 and 62, is subjected only to lateral compressive force in a radial direction, where the mass has its highest strength properties. After completion of the bonding step, retort or envelope 52 is removed from ceramic mass 43 and cooled by suitable means at a desired rate, during which dimensional changes of tooling masses 38, 40, and 42 occur as described in connection with FIG. 1, whereby the tooling members separate themselves from the surfaces of solid unitary workpiece 64.

Referring to FIG. 5, workpiece 70 characterized by nonuniform distribution of mass therein is shown in a suitable airtight envelope 72 and arranged with the various workpiece components in their desired final relationship before the diffusion bonding operation is undertaken. As seen from FIGS. 6 and 7, for example, workpiece 70 is initially of composite nature including a series of large flat rings 74 and 76 arranged in the general manner discussed in connection with FIG. 1 and wafers 8 shown therein. Rings 74 and 76 are substantially concentric with each other and arranged in contact with other similar rings along planes which are parallel and horizontal in the view shown in FIG. 6. With workpiece elements 74 and 76 arranged as shown in FIG. 6, it may be seen from FIG. 5 that an annular cavity 78 is formed between the rings, and that the cavity 78 is divided by a center ring 80 shown in FIG. 6 and adapted to form an intermediate web in the finished workpiece analogous to web 27 formed by disk 9 as discussed above and shown in FIGS. 1 and 2. As seen from FIG. 8 showing the finished workpiece, a plurality of upstanding or vertical webs 82 are also included in workpiece 70. Each of the webs 82 may be formed by a narrow vertical stack of strips 84 arranged in the manner shown by FIG. 6 and preplaced at the location suggested by FIG. 5 so that bonding of strips 84 to each other and to rings 74 and 76 simultaneously with bonding of the rings to each other will result in the configuration suggested by FIG. 8.

As seen in FIG. 7, the workpiece components 74, 76, 80, and 84 are supported and confined by a plurality of separate tooling masses, the largest of which are shown by masses 90 and 92 of generally corresponding shape and function. Mass 90 has an annular flange portion 94 and an axisymmetrical central portion 96 having substantially cylindrical walls and adapted to contact the inner peripheral surface 98 of the cylinder defined by rings 74 and 80. As further noted from FIGS. 5 and 7, it may be seen that the annular cavity 78 in those portions situated above center web 80 and between vertical webs 82 formed by strips 84 contain additional filler metal or tooling masses 100 above ring 80 and 102 on the lower side thereof. Since the tooling masses 100 and 102 will normally comprise material susceptible to diffusion bonding with tooling masses 90 and 92, respectively, it is preferable that suitable measures be taken to prevent such diffusion bonding. To this end, a diffusion barrier such as annular shims 104 and 106 may be preplaced in surface contact with upper and lower tooling masses 100 and 102, respectively, and have a generally corresponding surface area therewith, in the manner suggested by FIG. 7. Moreover, the same diffusion barrier material which is preferably titanium in the illustrated case discussed hereinbelow may be used in two rounded sheets or disks 110 and 112 to separate tooling masses 90 and 92 from envelope or retort 72 to interfere and prevent diffusion bonding of items 90 and 92 with the walls of the retort.

In addition to inner tooling masses 90 and 92, the structure shown in FIGS. 5 and 7, for example, may be seen to include substantially cylindrical restraining mass 114 adapted to surround the assembled workpiece elements and constrain the same against radial outward expansion. Where workpiece masses 74, 76, 80, and 84 are titanium, tooling masses 90, 92, 100, and 102 may advantageously comprise stainless steel in the 300 series, whereas tooling mass 114 preferably comprises advanced alloy precipitation hardenable steel such as PH 17–7 Mo alloy. Retort 72 similarly comprises series 300 steel and may be conveniently formed in two identical half sections having annular flanges as suggested at 116 and 118 in FIG. 7. With the flanges welded or otherwise joined together to make an airtight connection, retort 72 may be evacuated of all atmosphere by connection of an external line 120 with a suitable source of vacuum (not shown) and the entire structure shown in FIG. 7 may thereafter be heated and subjected to pressure for a sufficient period of time to cause bonding of the workpiece components such as in the manner discussed above in connection with FIGS. 1 and 3.

The finished workpiece resulting from the structures and procedures discussed above and shown in FIGS. 5–7 may be seen in FIG. 8. As in the case of FIG. 1, it will be understood that use of the materials suggested in connection with FIG. 7 will result in shrinkage of tooling masses 90, 92, 100, and 102 upon cooling after the diffusion bonding process is otherwise completed, and that such shrinkage will cause the tooling masses to draw away from contact with the adjacent surfaces of the workpiece mass. Similarly, expansion of the material in tooling mass 114 will result in separation of the same from contact with the workpiece, and all of the mentioned tooling masses may be easily removed without application of force, distortion or hammer blows in order to recover workpiece 70. The same tooling masses may thereafter be reused many times for mass production of additional workpieces corresponding exactly in shape and size with workpiece 70 shown in FIG. 8.

It is also a feature of the process discussed above and the structures shown in all the figures of this case that a minimum of workpiece materials are required to form parts having a wide variety of different sizes, shapes, and complexity. For example, wafers 8 and 9 in FIG. 1 could be of any shape or cross-sectional configuration required to produce the final desired form, and no cutting or metal removal operations would be necessary on workpiece 24. The same naturally applies to workpieces 64 and 70 shown in FIGS. 4 and 8, respectively. Moreover, the use of restraining mass 43 of ceramic material outside of envelope 18, 19 in FIG. 1, or envelope 72 in FIG. 7, could optionally be used when desirable or necessary, such as in mass producing parts where a minimum of heating, cooling, and pressure application time periods are of crucial importance. Thus, heating and cooling of envelope 52 in FIG. 3, for example, separate from mass 43 involves less time than would be necessary if mass 43 had to be similarly heated and cooled. Also, use of mass 43 permits higher pressures to be applied during the diffusion bonding step and less duration than those permitted when tooling element 42 is used alone to restrain diametrical expansion of the workpiece elements.

The Masrock material mentioned above for use in mass 43 is a fused amorphous silica having good strength and resistance to high temperatures, hence is better suited to the present application than some other ceramics. However, any material capable of withstanding high bonding temperatures and providing the dual functions of temperature insulation and compressive load transmission may be used in mass 43. Glasrock material is also an amorphous silica and is usable in the foregoing context, although Glasrock has less density and less compressive strength than Masrock. Glasrock is available from Glasrock Products, Inc., mentioned above, and is more fully disclosed in U.S. Patent No. 3,189,337 issued June 15, 1965.

We claim:

1. A method of forming solid state molecular diffusion bonded joints between a plurality of metallic workpiece elements by application of static unidirectional compressive force thereto, comprising:
   arranging said workpiece elements substantially in desired final relationship,
   supporting said workpiece elements in said relationship with filler metal members,
   surrrounding said workpiece elements with a rigid restraining mass adapted to prevent substantially all lateral deformation of said workpieces in a direction normal to said static compressive force during application thereof.
   heating said workpiece elements to an elevated temperature sufficient to produce said bonding of said joints under coordinated temperature-pressure-duration conditions, and
   applying said pressure to said workpiece elements in an amount at least sufficient to produce deformation thereof at said temperature and said duration in the absence of said restraining mass.

2. The method set forth in claim 1 above, further including:
   placing said elements in an airtight envelope sized to fit within said restraining mass,
   heating said workpiece elements within said envelope without said restraining mass, and thereafter
   performing said surrounding step by fitting said envelope and contents into said mass.

3. The method set forth in claim 1 above, further including:
   placing said elements, said members and said mass all within an airtight envelope,
   performing said heating step by placing said envelope and its contents in a furnace, and
   applying said pressure by compressing said envelope and its contents between two platens of a press, said mass being subjected only to force substantially normal to said compressive force.

4. A method of forming solid state diffusion bonded joints between a plurality of metallic workpiece elements, comprising:
   arranging said workpiece elements substantially in desired final relationship,
   supporting said workpiece elements in said relationship by filler members,
   enclosing said elements and said members in an atmospheric envelope,
   heating said envelope and its contents to an elevated temperature less than the melting point of said elements,
   placing said heated envelope and its contents within a restraining mass in substantially uniform surface contact therewith,
   applying static compressive unidirectional force to said envelope in an amount and for a duration sufficient to cause said bonding of said joints at said elevated temperature, and thereafter
   removing said envelope and said contents from said mass and cooling same,
   said mass being adapted to prevent lateral deformation of said envelope and its contents during application of said pressure for said duration.

5. A method of solid state diffusion bonding a plurality of metallic workpiece elements together by application of unidirectional static pressure thereto to form a single unitary workpiece, said elements being joined between contacting surfaces angularly disposed relative to the direction of said static pressure, comprising:
   arranging said workpiece elements substantially in desired final relationship with said surfaces in contact,
   confining said workpiece elements against lateral deformation in a direction normal to said direction of static pressure,
   heating said elements to an elevated temperature less than the melting point of said metallic material,
   applying said static pressure in an amount sufficient to produce said bonding at said temperature, and
   maintaining said temperature and said pressure for a sufficient duration to cause said bonding to occur,
   said pressure being higher than that at which said lateral deformation of said workpiece components would occur in the absence of said confinement at said temperature and said duration.

6. The method set forth in claim 1 above, wherein:
   said filler metal members comprise a first metallic alloy adapted to shrink upon cooling from an elevated temperature and are sized to fit within cavities formed in said arranged workpiece elements, and
   said restraining mass is a second metallic alloy adapted to expand upon cooling from an elevated temperature.

7. The method set forth in claim 6 above, wherein:
   said first alloy consists of a steel alloy within the 300 series, and
   said second alloy consists of a precipitation hardenable advanced alloy including chromium and nickel.

8. The method set forth in claim 6 above, wherein:
   said restraining mass comprises a high strength, temperature resistant ceramic.

9. A method of forming solid state diffusion bonded joints between a plurality of metallic workpiece elements, comprising:
   arranging said workpiece elements substantially in desired final relationship,
   supporting said workpiece elements in said relationship by filler members adapted to fit within at least one cavity formed by said arranged elements,
   enclosing said elements and said filler members in an atmospheric envelope,
   heating said envelope and its contents to an elevated temperature less than the melting point of said elements,
   placing said heated envelope and contents within a restraining mass of ceramic in substantially uniform surface contact therewith,
   said ceramic mass having a reinforcing metallic outer tooling member in substantially uniform surface contact therewith, applying static compressive unidirectional force to said envelope in an amount and for a duration sufficient to cause said bonding of said joints at said elevated temperature and thereafter removing said envelope and said contents from said mass and cooling said envelope and contents, said ceramic mass and reinforcing metallic element being adapted to prevent lateral deformation of said envelope and said contents during application of said pressure for said duration.

10. The method set forth in claim 9 above, wherein:
said restraining ceramic mass comprises Masrock material.

11. The method set forth in claim 9 above, wherein:
said restraining ceramic mass comprises Glasrock material.

References Cited
UNITED STATES PATENTS

| | | | |
|---|---|---|---|
| 2,807,082 | 9/1957 | Zambrow et al. | 29—498X |
| 3,070,880 | 1/1963 | Davis et al. | 29—498X |
| 3,380,146 | 4/1968 | Babel et al. | 29—470.9X |
| 3,444,608 | 5/1969 | Conn, Jr., et al. | 29—470.9X |

JOHN F. CAMPBELL, Primary Examiner

R. J. SHORE, Assistant Examiner

U.S. Cl. X.R.

29—470.1, 472.3, 497.5